US009961682B2

(12) United States Patent
Maciel et al.

(10) Patent No.: US 9,961,682 B2
(45) Date of Patent: May 1, 2018

(54) METHOD AND APPARATUS FOR RESOURCE ALLOCATION TO MAXIMIZE THE TOTAL DATA RATE IN SC-FDMA UPLINK

(71) Applicant: Telefonaktiebolaget L M Ericsson (publ), Stockholm (SE)

(72) Inventors: Tarcísio Maciel, Fortaleza (BR); Francisco Rodrigo Porto Cavalcanti, Fortaleza (BR); Walter da Cruz Freitas Junior, Fortaleza (BR); Francisco Rafael Marques Lima, Fortaleza (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

(21) Appl. No.: 14/441,276

(22) PCT Filed: Nov. 13, 2013

(86) PCT No.: PCT/SE2013/051338
§ 371 (c)(1),
(2) Date: May 7, 2015

(87) PCT Pub. No.: WO2014/077768
PCT Pub. Date: May 22, 2014

(65) Prior Publication Data
US 2015/0312911 A1 Oct. 29, 2015

Related U.S. Application Data

(60) Provisional application No. 61/726,376, filed on Nov. 14, 2012.

(51) Int. Cl.
*H04W 72/04* (2009.01)
*H04W 72/08* (2009.01)
(Continued)

(52) U.S. Cl.
CPC ...... *H04W 72/0453* (2013.01); *H04L 5/006* (2013.01); *H04W 24/02* (2013.01); *H04W 72/08* (2013.01)

(58) Field of Classification Search
None
See application file for complete search history.

(56) References Cited

U.S. PATENT DOCUMENTS 7,911,934 B2 3/2011 Wong et al.
2007/0297386 A1* 12/2007 Zhang .................. H04L 5/06
370/344

(Continued)

FOREIGN PATENT DOCUMENTS

WO 2014077769 A1 5/2014

OTHER PUBLICATIONS

Myung, H., et al., "Single Carrier FDMA for Uplink Wireless Transmission", IEEE Vehicular Technology Magazine, 2006-090-01, pp. 30-38, IEEE.

(Continued)

*Primary Examiner* — Suk Jin Kang
(74) *Attorney, Agent, or Firm* — Coats & Bennett, PLLC

(57) ABSTRACT

A low-complexity Radio Resource Allocation method (100, 200) efficiently assigns frequency resources, such as a set of contiguous subcarriers, to Mobile Terminals in SC-FDMA uplink systems. The inventive method initially finds the resource allocation that leads to maximum efficiency in terms of transmitted data rate, without considering any resource adjacency constraint. Subsequently, the method iteratively redefines the resource allocation in order to find a resource allocation that is in accordance with resource allocation adjacency required by the SC-FDMA multiple access scheme.

17 Claims, 9 Drawing Sheets

(51) Int. Cl.
*H04L 5/00* (2006.01)
*H04W 24/02* (2009.01)

(56) References Cited

U.S. PATENT DOCUMENTS

| | | | | |
|---|---|---|---|---|
| 2008/0013599 | A1* | 1/2008 | Malladi | H04L 5/0007 375/132 |
| 2008/0080545 | A1* | 4/2008 | Wong | H04L 27/2608 370/437 |
| 2009/0073929 | A1* | 3/2009 | Malladi | H04B 1/7136 370/329 |
| 2009/0161612 | A1 | 6/2009 | Liu et al. | |
| 2009/0163218 | A1 | 6/2009 | Liu et al. | |
| 2010/0312894 | A1* | 12/2010 | Awad | H04L 5/0007 709/226 |
| 2011/0013092 | A1* | 1/2011 | Chung | H04W 16/06 348/732 |
| 2011/0065446 | A1* | 3/2011 | Mueck | H04W 72/082 455/452.2 |
| 2011/0117948 | A1 | 5/2011 | Ishii et al. | |
| 2011/0183697 | A1 | 7/2011 | Akimoto et al. | |
| 2011/0275399 | A1* | 11/2011 | Englund | H04W 72/1231 455/513 |
| 2012/0008591 | A1 | 1/2012 | Miki et al. | |
| 2012/0093095 | A1 | 4/2012 | Barbieri et al. | |
| 2012/0134275 | A1* | 5/2012 | Choi | H04L 5/0057 370/241 |
| 2012/0243488 | A1 | 9/2012 | Gupta et al. | |
| 2012/0314674 | A1* | 12/2012 | Seo | H04L 1/1861 370/329 |
| 2013/0010720 | A1* | 1/2013 | Lohr | H04L 1/0026 370/329 |
| 2013/0044697 | A1 | 2/2013 | Yoo et al. | |
| 2013/0070724 | A1* | 3/2013 | Malladi | H04L 5/0007 370/330 |
| 2013/0142062 | A1* | 6/2013 | Dinan | H04W 24/00 370/252 |
| 2013/0163553 | A1* | 6/2013 | Lee | H04L 1/0027 370/329 |
| 2013/0170468 | A1 | 7/2013 | Baker et al. | |
| 2013/0182627 | A1* | 7/2013 | Lee | H04W 72/042 370/311 |
| 2013/0215819 | A1* | 8/2013 | Ji | H04L 5/0053 370/315 |
| 2013/0336259 | A1* | 12/2013 | Awad | H04L 5/0007 370/329 |
| 2014/0192759 | A1* | 7/2014 | Son | H04W 72/042 370/329 |
| 2014/0247795 | A1 | 9/2014 | Kim et al. | |
| 2014/0301329 | A1* | 10/2014 | Kim | H04L 1/1861 370/329 |
| 2014/0321439 | A1 | 10/2014 | Choi | |
| 2014/0342746 | A1 | 11/2014 | Nakashima et al. | |
| 2014/0369217 | A1 | 12/2014 | Kim et al. | |
| 2015/0078284 | A1* | 3/2015 | Lee | H04W 24/10 370/329 |
| 2015/0085806 | A1* | 3/2015 | Dinan | H04W 24/00 370/329 |
| 2015/0155928 | A1* | 6/2015 | Seo | H04L 5/0053 370/329 |
| 2015/0208387 | A1* | 7/2015 | Awad | H04W 72/042 370/329 |
| 2015/0223263 | A1* | 8/2015 | Soong | H04B 7/2606 370/315 |
| 2015/0256306 | A1* | 9/2015 | Kim | H04B 7/024 370/329 |
| 2015/0257164 | A1* | 9/2015 | Lim | H04L 5/0073 370/252 |
| 2015/0264669 | A1* | 9/2015 | Kim | H04L 5/0048 370/329 |
| 2016/0029403 | A1 | 1/2016 | Roy et al. | |
| 2016/0044687 | A1* | 2/2016 | Mueck | H04W 72/082 455/452.2 |
| 2016/0254847 | A1 | 9/2016 | Choi | |

OTHER PUBLICATIONS

Lima, F., et al., "Scheduling for Improving System Capacity in Multiservice 3GPP LTE", Research Article, Journal of Electrical and Computer Engineering, Article ID 819729, Jan. 1, 2010, pp. 1-16, Hindawi Publishing Corporation.

Wong, I., et al., "Optimal Resource Allocation in Uplink SC-FDMA Systems", Transactions Letters, IEEE Transactions on Wireless Communications, May 1, 2009, pp. 2161-2165, vol. 8, No. 5, IEEE.

* cited by examiner

METHOD AND APPARATUS FOR RESOURCE ALLOCATION TO MAXIMIZE THE TOTAL DATA RATE IN SC-FDMA UPLINK

This application is the National Stage of International Application No. PCT/SE2013/051338, filed Nov. 13, 2013, which claims the benefit of U.S. Provisional Application 61/726,376, filed Nov. 14, 2012, the disclosures of each of which are incorporated herein by reference in their entirety.

TECHNICAL FIELD

The present invention relates generally to Radio Resource Allocation, and in particular to a low-complexity, iterative method of resource allocation to maximize the total data rate in SC-FDMA uplink.

BACKGROUND

Mobile communication networks are ubiquitous in many parts of the world. Third- and fourth-generation mobile networks utilize Radio Frequency (RF) transmissions in a Radio Access Network (RAN) to effect voice and data communications between geographically dispersed network nodes (Base Stations or BSs) and a large number of mobile communication terminals (Mobile Terminals, or MTs). Radio Resource Allocation (RRA) algorithms are responsible for the management of the scarce resources available in the RAN. Efficient RRA is critical since the limited resources must be shared by numerous communication links in the mobile networks. If the radio resources are used efficiently, more communication links can be provided by the mobile network, increasing capacity and thus generating more operating revenue for a given fixed network infrastructure investment.

Since RRA manages the available radio resources, system aspects that restrict the use of these resources have a direct impact on the RRA design. Among these system aspects that must be considered are the multiple access schemes, power budgets on BSs and MTs, signaling load limitations, and many others.

The 3rd Generation Partnership Project (3GPP), a wireless communication standards body, has chosen Single Carrier—Frequency Division Multiple Access (SC-FDMA) as the multiple access technology for the uplink of Long Term Evolution (LTE) networks. One reason for adopting SC-FDMA is its property of controlling Peak-to-Average Power Ratio (PAPR). Signals with high PAPR place a significant burden on MTs, due to the need for highly linear power amplifiers to avoid excessive signal distortion. For more information, see the paper by H. G. Myung, J. Lim, and D. J. Goodman, titled "Single Carrier FDMA for Uplink Wireless Transmission," published in IEEE Vehicular Technology Magazine, vol. 1, no. 3, pp. 30-38, September 2006, the disclosure of which is incorporated herein by reference in its entirety.

The SC-FDMA multiple access scheme imposes two constraints on resource assignment: exclusivity and adjacency. With the exclusivity constraint, a given frequency resource, such as an OFDM subcarrier or set of frequency-adjacent OFDM subcarriers, should not be shared by multiple MTs within a cell. In other words, each frequency resource should be assigned to at most one MT within a cell to prevent intra-cell interference. In the adjacency constraint, the frequency resource blocks allocated to a given MT for transmission—i.e., a set of two or more frequency resources—should be adjacent to each other in the frequency domain, so as to obtain benefits in terms of PAPR. The adjacency constraint significantly reduces the freedom in RRA compared to other multiple access schemes.

Optimized and efficient RRA leads to improved utilization of scarce radio resources. In practical terms, improved resource utilization means the transmission of more bits per radio resource. A typical system capacity metric is the number of transmitted bits per time and frequency resource. Accordingly, one standing challenge in modern mobile communication network design is performing RRA so as to improve the resource usage/capacity in the SC-FDMA uplink. Several theoretical or computationally complex approaches to this task are known in the art. However, a significant practical constraint, lacking in prior art solutions, is that RRA optimization should be possible with affordable computational complexity. This means that a RRA method or algorithm must be able to solve the resource allocation problem within the short time period required by scheduling tasks in mobile networks. Prior art approaches to SC-FDMA uplink RRA do not achieve sufficiently affordable computational complexity to be useful in real-world mobile networks.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments of the present invention, a low-complexity RRA method efficiently assigns frequency resources to MTs in e.g. SC-FDMA uplink systems. As used herein, one example of a frequency resource is a set of one or more contiguous subcarriers. The inventive method initially finds a resource allocation that leads to maximum spectral efficiency, such as in terms of transmitted data rate, without considering any resource adjacency constraint. Subsequently, the method iteratively redefines the resource allocation in order to find a resource allocation that is in accordance with resource allocation adjacency required by e.g. the SC-FDMA multiple access scheme.

One embodiment relates to a method, by a base station of a wireless communication network, of allocating a first plurality of frequency resources among a second plurality of requesting mobile terminals, the allocation satisfying both an exclusivity constraint that each frequency resource may be allocated to only one mobile terminal in a cell of a cellular system, and an adjacency constraint that all frequency resources allocated to any given mobile terminal are contiguous in the frequency domain. The base station receives channel conditions of the frequency resources as experienced by each mobile terminal. The base station initially allocates frequency resources among the mobile terminals, based on the received channel conditions, to maximize spectral efficiency, the allocation satisfying the exclusivity constraint but made without regard to the adjacency constraint. For each mobile terminal allocated at least one frequency resource, the base station clusters contiguous frequency resources allocated to the mobile terminal, to generate one or more virtual resources (VR). The base station then iteratively groups and reallocates the VRs according to predetermined rules until the resource allocation satisfies the adjacency constraint.

One predetermined rule is to cluster all VRs lying between a first and a second VR, inclusively, that are allocated to the same mobile terminal, and to allocate the new VR to that mobile terminal.

Another predetermined rule is to identify a VR allocated to a particular mobile terminal, cluster an adjacent VR with the identified VR, and allocate the new VR to that mobile terminal.

Another embodiment relates to a base station operative in a wireless communication network, the base station operative to allocate a first plurality of frequency resources among a second plurality of requesting mobile terminals, the allocation satisfying both an exclusivity constraint that each frequency resource may be allocated to only one mobile terminal, and an adjacency constraint that all frequency resources allocated to any given mobile terminal are contiguous in the frequency domain. The base station includes a transceiver operative to exchange signaling messages with each requesting mobile terminal, memory, and a controller operatively coupled to the memory. The controller is operative to receive and store in memory channel conditions of the frequency resources as experienced by each mobile terminal. The controller is also operative to initially allocate frequency resources among the mobile terminals, based on the received channel conditions, to maximize spectral efficiency, the allocation satisfying the exclusivity constraint but made without regard to the adjacency constraint. For each mobile terminal allocated at least one frequency resource, the controller is operative to cluster contiguous frequency resources allocated to the mobile terminal, to generate one or more virtual resources (VR). The controller is operative to then iteratively group and reallocate the VRs according to predetermined rules until the resource allocation satisfies the adjacency constraint.

Yet another embodiment relates to a non-transient computer readable media storing program instructions operative to allocate a first plurality of frequency resources among a second plurality of requesting mobile terminals, the allocation satisfying both an exclusivity constraint that each frequency resource may be allocated to only one mobile terminal, and an adjacency constraint that all frequency resources allocated to any given mobile terminal are contiguous in the frequency domain. The program instructions are operative to cause a controller to initially allocate frequency resources among the mobile terminals, based on stored channel conditions of the frequency resources as experienced by each mobile terminal, to maximize spectral efficiency, the allocation satisfying the exclusivity constraint but made without regard to the adjacency constraint; for each mobile terminal allocated at least one frequency resource, cluster contiguous frequency resources allocated to the mobile terminal, to generate one or more virtual resources (VR); and iteratively group and reallocate the VRs according to predetermined rules until the resource allocation satisfies the adjacency constraint.

Embodiments herein provide a solution to the resource allocation problem in e.g. the SC-FDMA uplink scenario with much lower worst-case computational complexity and reasonable performance losses compared to prior art.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
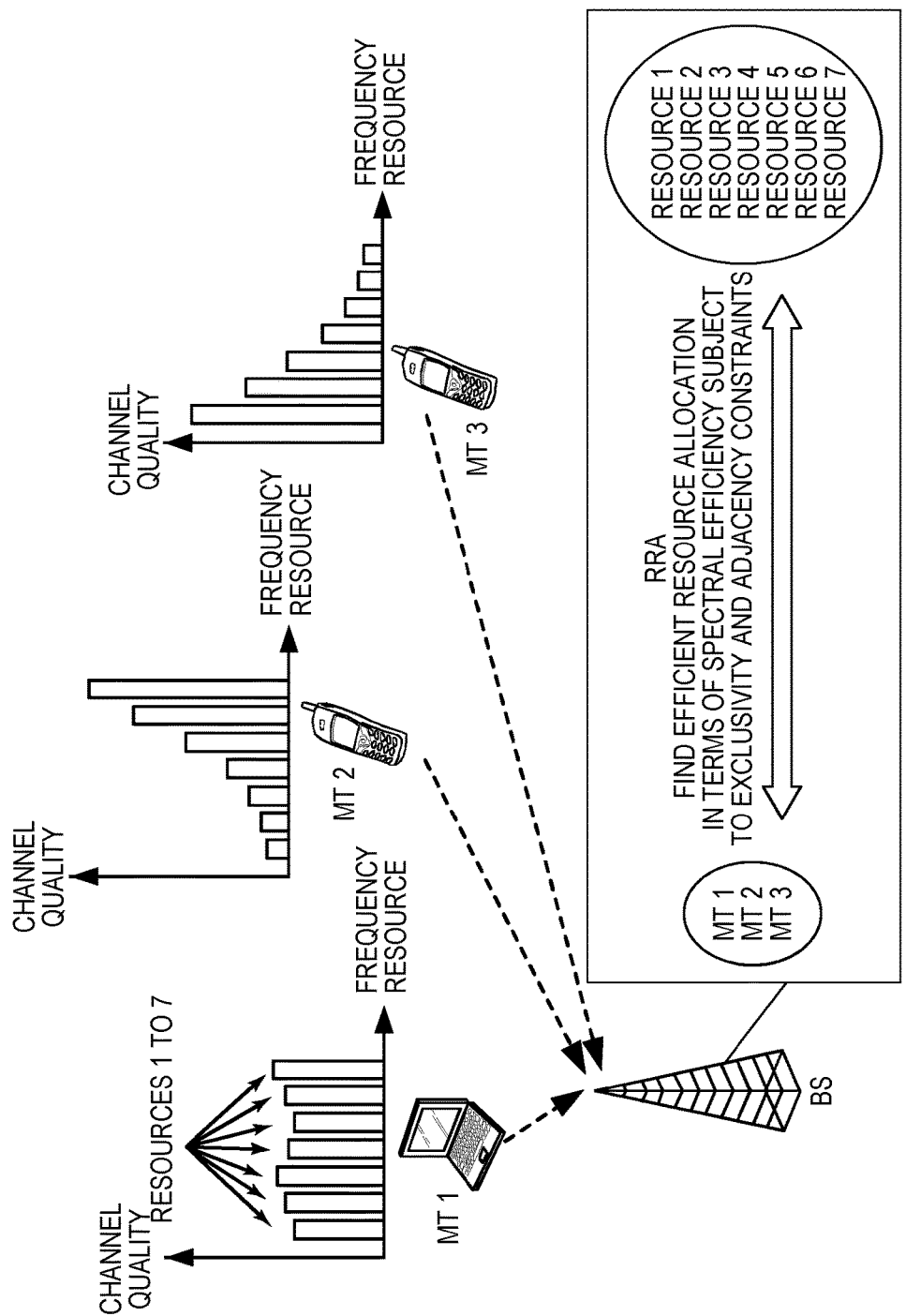
FIG. 1 is a diagram depicting the SC-FDMA uplink resource allocation problem.

FIG. 1 depicts part of a RAN, comprising a Base Station (BS) receiving uplink communications from three Mobile Terminals (MT1, MT2, MT3). Graphs associated with each MT depict the instantaneous channel quality state on each frequency resource. In this simplified example, seven frequency resources are depicted. As depicted in the graph, the MT1 experiences roughly equal channel quality on all frequency resources. MT2 experiences a low channel quality on the lower-frequency resources, and a higher channel quality on the higher-frequency resources. Finally, MT3 experiences a high channel quality on the lower-frequency resources, and a low channel quality on the higher-frequency resources. The problem to be solved by the RRA functionality—as indicated in the box associated with the BS—is to define which resources each MT should use to transmit data to the BS during a pre-defined duration, such as a frame. This allocation should be made so as to provide high spectral efficiency, and satisfy the SC-FDMA constraints of resource exclusivity and adjacency. The RRA method should be achievable with affordable computational complexity.

Figure 2:
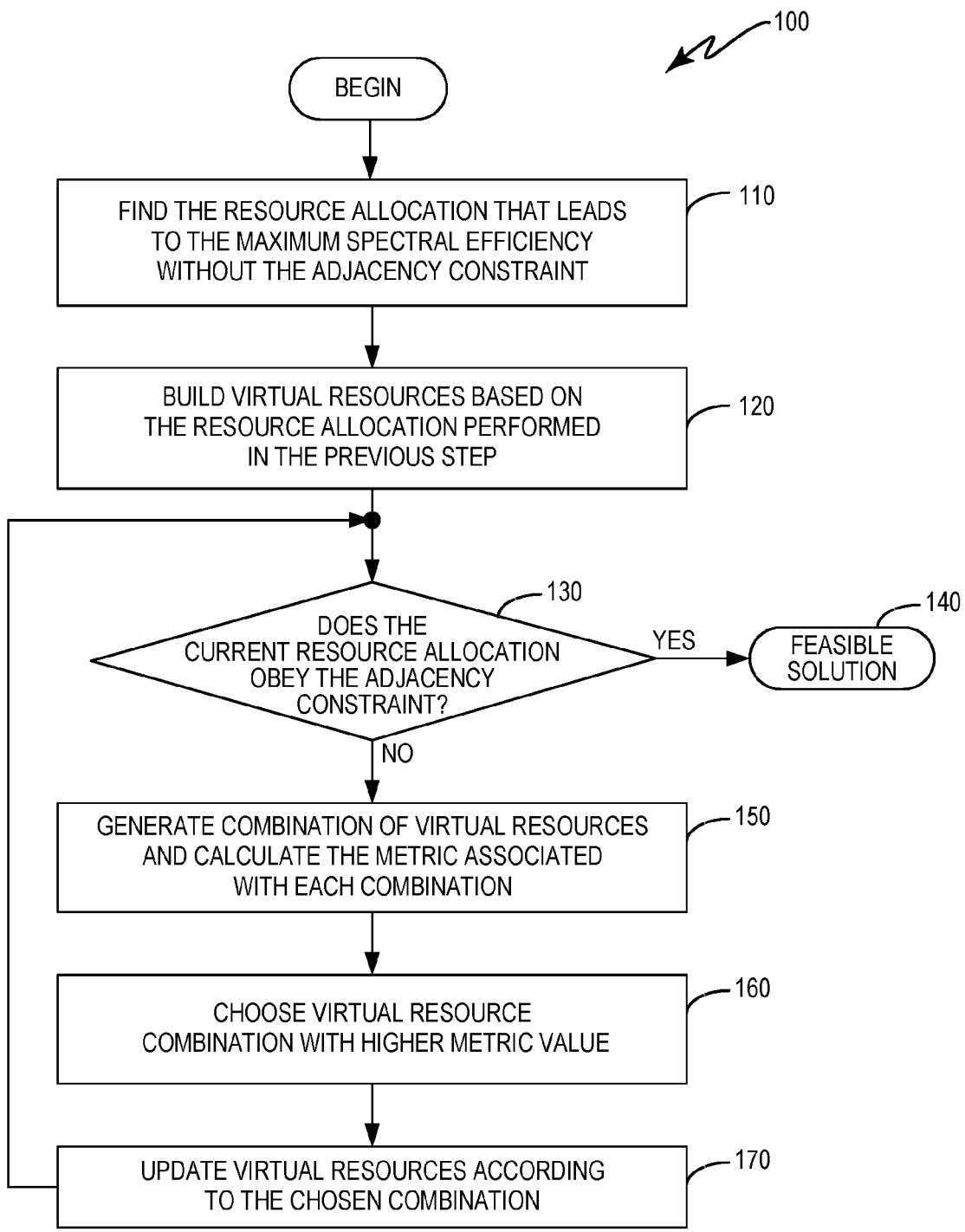
FIG. 2 is a flow diagram of a method of SC-FDMA uplink resource allocation.

FIG. 2 depicts one method 100 of optimized RRA for SC-FDMA uplink having affordable computational complexity. As the method 100 begins, the BS has knowledge of at least one metric that represents the channel quality state of each frequency resource for each MT. This could be, for example estimates of the Signal to Interference and Noise Ratio (SINR) for each frequency resource. As known in the art, this information can be obtained by feedback information sent by each MT to the BS, using control channels. Based on this information the BS assigns each frequency resource to the MT that presents the highest channel quality state for it (block 110). That is, the frequency resources are allocated to MTs based on reported channel quality, without consideration of any adjacency constraint. Where multiple MTs report the same or close channel quality, the BS may employ "tie-breaker" algorithms, such as round-robin, as known in the art. Because each frequency resource is allocated to only one MT, the exclusivity constraint of SC-FDMA is satisfied.

Virtual Resources (VR) are then constructed from sets of contiguous frequency resources assigned to a given MT (block 120). A VR is associated with the MT to which the constituent frequency resources were allocated. VR identification is thus a clustering operation performed on the resource allocation performed in block 110.

Figure 3:
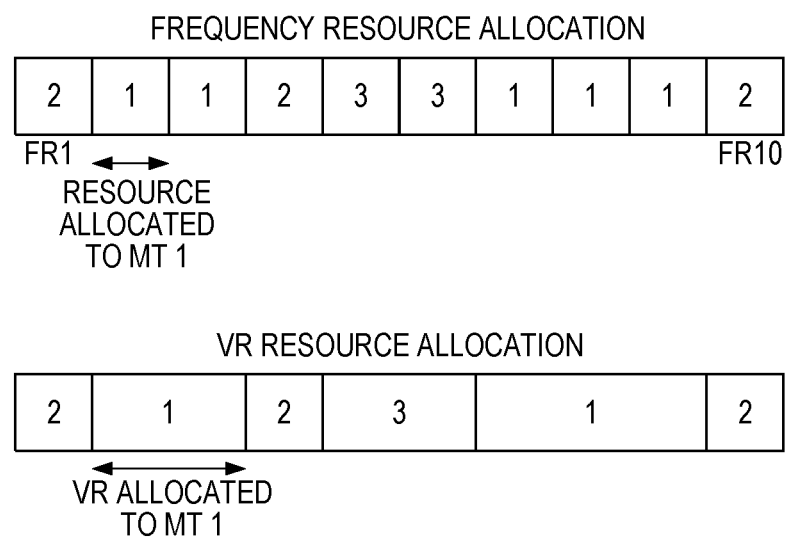
FIG. 3 is a subcarrier diagram representing a clustering step of the method of FIG. 2.

FIG. 3 depicts one simplified example of constructing VRs from allocated frequency resources. After frequency resource allocation, a representative set of frequency resources (e.g., a set of one or more adjacent subchannels) are allocated to three MTs requesting uplink scheduling (block 110 of FIG. 2). Initially, as indicated in the upper diagram of FIG. 3, the MTs are allocated the frequency resources on the basis of reported channel quality (and possibly other factors, such as the uplink bandwidth requested). In this example, ten frequency resources (FR1-FR10) are allocated among three MTs, identified as MT1, MT2, and MT3. For example, FR2, FR3, and FR7-FR9 are allocated to MT1, as indicated by the numeral "1" in these frequency resources. This allocation is irrespective of the adjacency constraint, but satisfies the exclusivity constraint.

Contiguous frequency resources allocated to each MT are then grouped, or clustered, to form VRs (block 120), as depicted in the lower diagram in FIG. 3. In particular, FR2 and FR3 are clustered, as are FR7-FR9, forming two VRs. Both of these VRs are associated with MT1. The frequency resources FR5 and FR6 are clustered into a VR allocated to MT3. Since MT2 was not allocated contiguous frequency resources in the resource allocation phase (block 110), no VR is formed for MT2.

The current VR allocation is then tested to determine whether it complies with the adjacency constraint (FIG. 2, block 130). If so, the method 100 has found an efficient solution to the problem (block 140). The adjacency constraint is fulfilled if the number of VRs allocated to each MT is less than or equal to one. If any MT has more than one VR allocated, they will necessarily be non-adjacent and the method 100 has not complied with the adjacency constraint. In this case, the resource allocation must be changed. In the example of FIG. 3, the adjacency constraint is not fulfilled following VR allocation, since MT1 has two VRs allocated, and MT2 has three VRs.

If the adjacency constraint is not satisfied (block 130), the method 100 reallocates and combines the existing VRs into new and larger VRs, and calculates an efficiency metric for each new VR (block 150). This efficiency metric is a measure of the benefit of the new VR to the total system efficiency.

To describe the methodology of VR reallocation, all MTs are identified by unique indices from 1 to J, and all VRs are identified by unique indices from 1 to V. In order to generate new VRs, the following three rules are applied to all VRs of all MTs:

Rule 1: Consider a given pair (MT j, VR v) where VR v is allocated to MT j. Assume also that VR v' is the lowest VR greater than v that belongs to MT j. Moreover, v" is the greatest VR lower than v that belongs to MT j. Based on VR v up to two new VRs can be created. The first new VR comprises all VRs between v and v' (including the VRs v and v'). The second new VR is composed of all VRs between v" and v (including the VRs v" and v). For a given pair (MT j, VR v), if only v' or v" exists, then only one new VR can be generated.

In other words, rule 1 states that, for a given pair (MT j, VR v), up to two new VRs are generated. The first one includes all VRs between VR v and the next VR on the left of VR v that belongs to MT j. The second new VR includes all VRs between the VR v and the next VR on the right of VR v that belongs to MT j. If there is no VR to the left or right of VR v that belongs to MT j, rules 2 and 3 are applied. This description assumes the frequency resources, and hence VRs, are arranged in order with lower frequency to the left and higher frequency to the right.

Rule 2: Consider a given pair (MT j, VR v) where VR v is allocated to MT j. If MT j does not have any other VR with index lower than v, a new VR is created from the VRs (v−1) and v. Note that in case VR v=1, no new VR is created. In other words, rule 2 states that if no VR allocated to MT j exists to the left of VR v, the VR v is combined with the VR to its immediate left (unless VR v is the left-most frequency resource).

Rule 3: Consider a given pair (MT j, VR v) where VR v is allocated to MT j. If MT j does not have any other VR with index higher than v, a new VR is created from the VRs v and (v+1). Note that in case VR v=V, no new VR is created. In other words, rule 3 states that if no VR allocated to MT j exists to the right of VR v, the VR v is combined with the VR to its immediate right (unless VR v is the right-most frequency resource).

Figure 4:
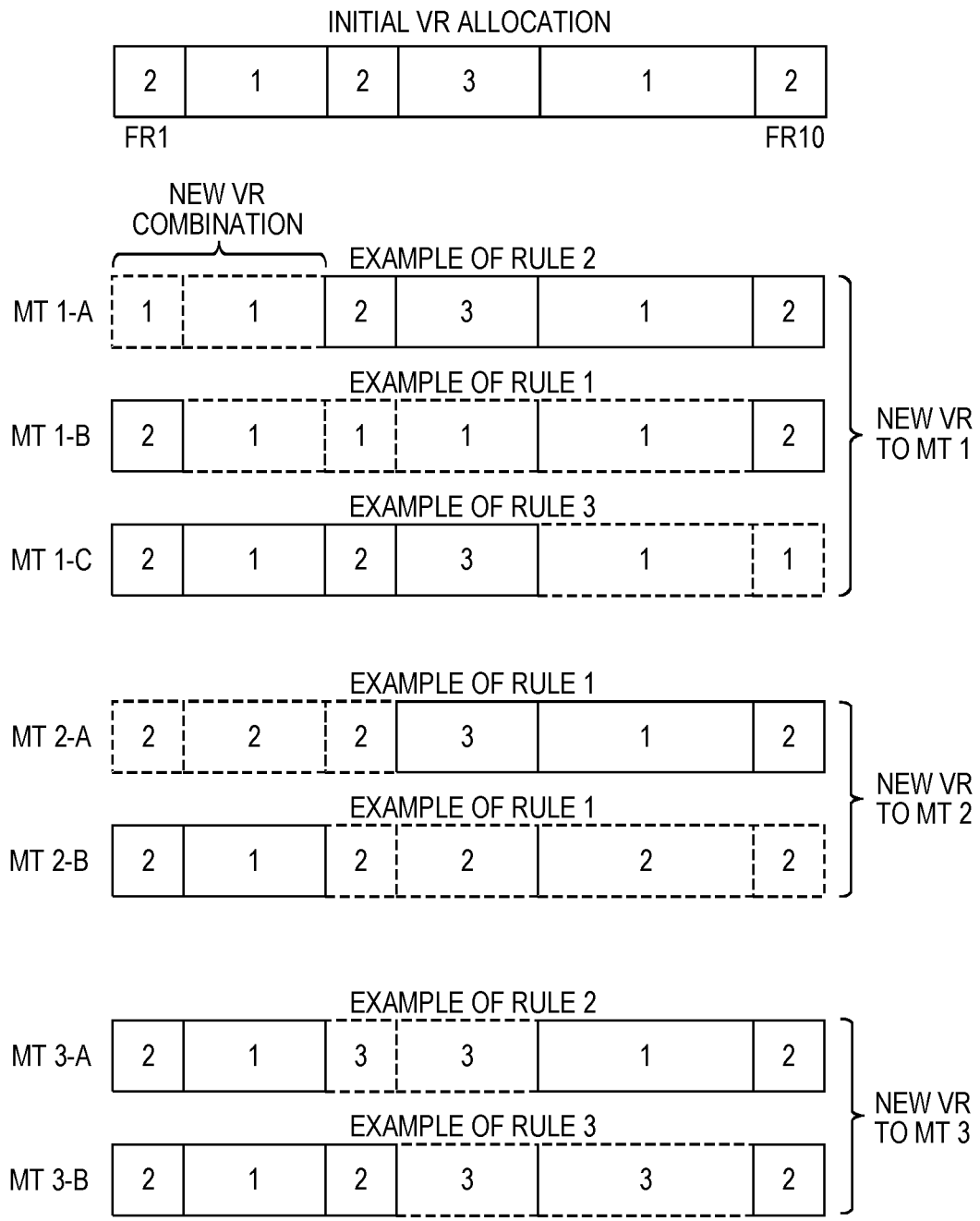
FIG. 4 a subcarrier diagram representing a reallocation step of the method of FIG. 2.

FIG. 4 depicts several possibilities for new VRs that can be generated in block 150 from the initial allocation of VRs (as depicted in FIG. 3), by the application of rules 1-3 above. Each new VR is highlighted by dotted lines. The new VR possibilities are identified to the left. The uppermost three examples (MT1-A, MT1-B, and MT1-C) are examples of VRs created by the application of rules 2, 1, and 3, respectively, to MT1 in the initial allocation. The middle two examples (MT2-A and MT2-B) depict VRs created by different applications of rule 1 to MT2 in the initial allocation. Finally, the lowermost two examples (MT3-A and MT3-B) demonstrate VRs created by the application of rules 2 and 3, respectively, to MT3 in the initial allocation.

In greater detail, example MT1-B depicts the application of rule 1 to MT1. Note that in the initial allocation, two non-adjacent VRs are associated with MT1—comprising frequency resources FR2-FR3 and FR7-FR9. Considering the right-most MT1 VR (FR7-FR9) as VR v, rule 1 results in allocating all VRs between VR v and the next VR on the left of VR v that belongs to MT1. Alternatively, the same result is reached by considering the left-most MT1 VR (FR2-FR3) as VR v, and applying rule 1 to allocate all VRs between VR v and the next VR on the right of VR v that belongs to MT1. In either case, the VR generation step of block 150 results in the allocation depicted in the example labeled MT1-B, where FR2-FR9 are allocated to MT1.

The example labeled MT1-A depicts the application of rule 2. Taking the left-most MT1 VR (FR2-FR3) as VR v, the application of rule 2 results in allocating the VR to the left of VR v (FR1) to MT1. This results in two MT1 VRs, FR1-FR3 and FR7-FR9.

The example labeled MT1-C depicts the application of rule 3. Taking the right-most MT1 VR (FR7-FR9) as VR v, the application of rule 2 results in allocating the VR to the right of VR v (FR10) to MT1. This results in two MT1 VRs, FR2-FR3 and FR7-FR10.

The MT2 examples MT2-A and MT2-B both depict two new candidate VRs for MT2. In particular, both examples depict the application of rule 1. In the example labeled MT2-A, considering either FR1 or FR4 to be VR v, upon applying rule 1 the intervening VR (comprising FR2-FR3) is reallocated to MT2, forming a new VR comprising FR1-FR4. In the example labeled MT2-B, considering either FR4 or FR10 to be VR v, upon applying rule 1 all of the intervening VRs FR5-FR6 formerly allocated to MT3 and FR7-FR9 formerly allocated to MT1) are reallocated to MT2, forming a new VR comprising FR4-FR10.

In the initial allocation, MT3 was allocated only a single VR, comprising FR5-FR6. Rule 1 is inapposite. Since the single VR is not the left-most or right-most VR in the initial allocation, both rules 2 and 3 may be applied. The example labeled MT3-A depicts the application of rule 2. The single MT3 (FR5-FR6) is necessarily VR v, and the application of rule 2 results in reallocating the VR to the left of VR v (FR4) from MT2 to MT3. The example labeled MT3-B depicts the application of rule 3. The application of rule 3 results in allocating the VR to the right of VR v (FR7-FR9) from MT1 to MT3.

The seven reallocation examples depicted in FIG. 4 are each evaluated regarding their contributions to the total system efficiency (also part of block 150). One example of an efficiency metric is the total data rate achieved when a given VR is assigned to a corresponding MT.

Referring again to FIG. 2, the VR combination exhibiting the highest efficiency metric is selected (block 160). The VRs and the associated MTs, as well as the new VR and MT indices, are updated (block 170). The new allocation is again tested (block 130) for compliance with the adjacency constraint of SC-FDMA multiple access. Note that none of the seven example VR reallocations depicted in FIG. 4 satisfy the adjacency constraint (block 130), and hence additional reallocations of VRs among MT1-MT3 will be required (block 150). The iterative VR reallocation loop of the method 100 continues until the adjacency constraint is satisfied (block 130), at which point a feasible solution has been found (block 140).

The RRA method 100 described herein was evaluated in computational simulations. The uplink resource assignment was evaluated in a simulation environment comprising a sector of a tri-sectorized cellular system. Results were obtained by performing numerous independent snapshots in order to get valid results in a statistical sense. In each snapshot, the MTs were uniformly distributed within a hexagonal sector whose BS is placed on a corner. SC-FDMA with uplink resources arranged in a time-frequency grid was considered. The resources comprise a group of twelve adjacent subcarriers in the frequency dimension by 1 ms long in the time dimension. The propagation model included a distance-dependent path loss model, a log-normal shadowing component, and a Rayleigh-distributed fast fading component. Specifically, the fast-fading component of the channel gain of a given MT is considered independent among resources. This hypothesis is reasonable since in general the resources are designed to have a frequency bandwidth on the order of the coherence bandwidth of the channel. Link adaptation was assumed to be performed based on the upper bound Shannon capacity.

Different numbers of frequency resources were considered and the transmit power per resource was chosen as 0.1 W. The main simulation parameters are summarized in Table 1 below. For the purpose of performing qualitative comparisons, in addition to the inventive RRA method 100 described herein, two additional methods were simulated. Both are described in U.S. Pat. No. 7,911,934, "Resource Allocation in Multi Data Stream Communication Link," referred to herein as Method 1 and Method 2 (corresponding to the first and second method disclosed in the '934 patent, respectively). The channel realizations were the same for all simulated algorithms in order to get fair comparisons. The choice of the number of MTs and resources was limited by the computational complexity to obtain the optimal solution. As a performance metric, the total data rate was considered as the sum of the data rates obtained by all the MTs in the sector in a given snapshot.

TABLE 1

| Simulation Parameters | | |
| --- | --- | --- |
| Parameter | Value | Unit |
| Cell radius | 334 | m |
| Transmit power per resource | 0.1 | W |
| Number of subcarriers per resource | 12 | — |
| Number of resource | 12 and 24 | — |
| Shadowing standard deviation | 8 | dB |
| Path loss [1] | $35.3 + 37.6 \cdot \log_{10} d$ | dB |
| Noise spectral density | $3.16 \cdot 10^{-20}$ | W/Hz |
| Number of snapshots | 3000 | — |
| BER for capacity gap (BER) | $10^{-4}$ | — |
| Number of flows | 6, 7, 8, 9, 10, 11 and 12 | — |

Figure 5:
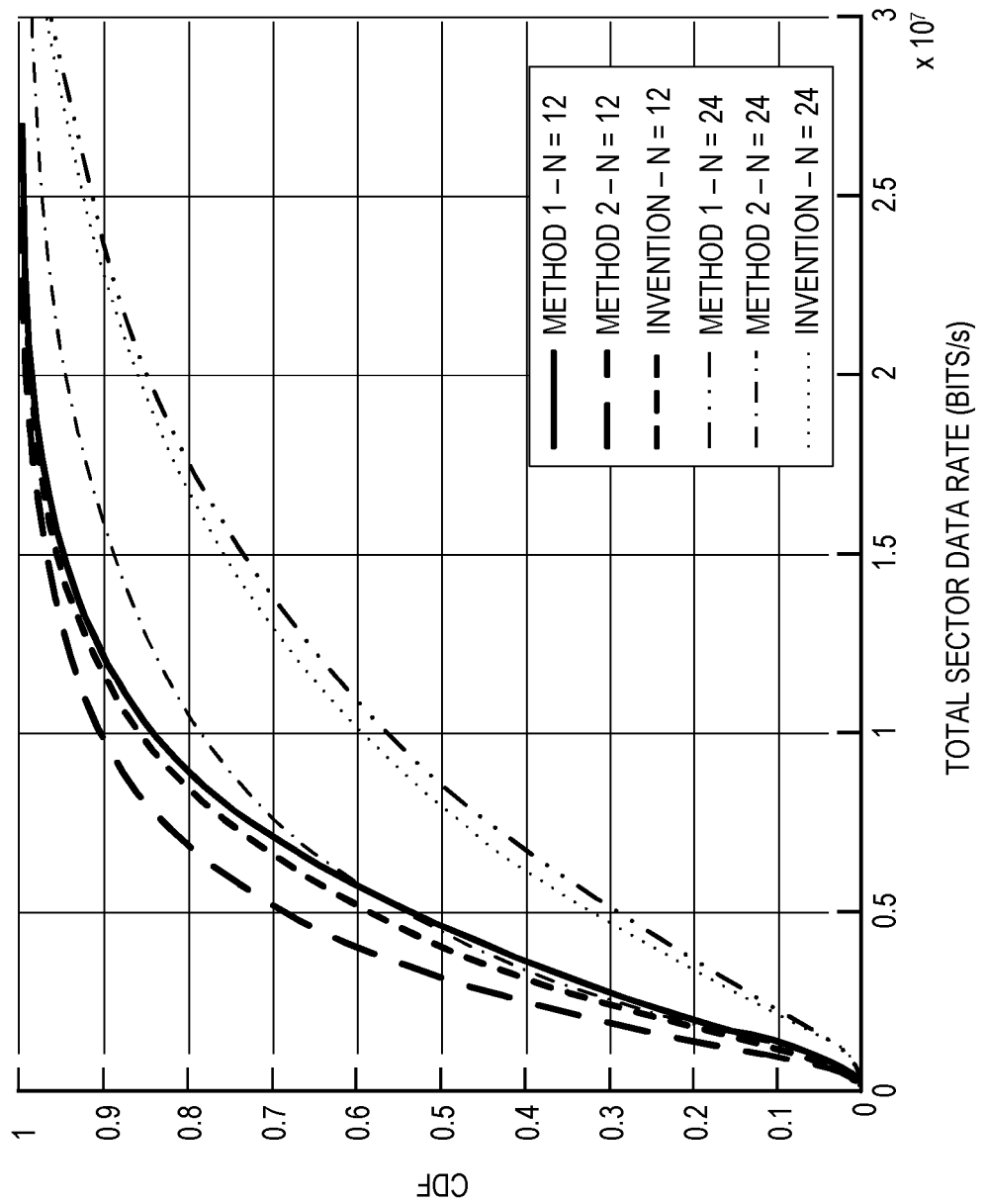
FIGS. 5, 6, and 7 are graphs depicting simulation results of the method of FIG. 2, applying different constraints and depicting various metrics.
Figure 6:
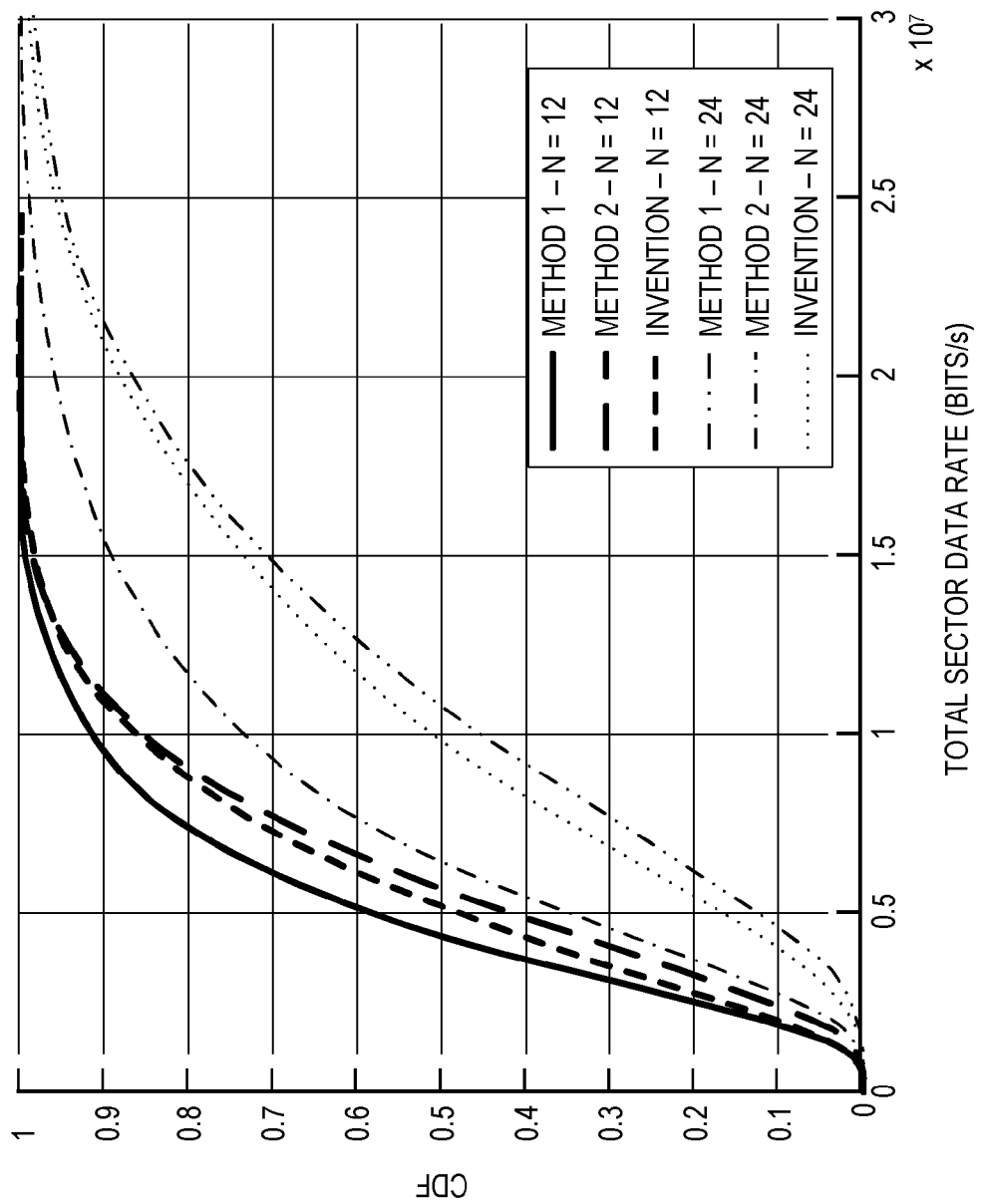

FIG. 5 depicts the Cumulative Distribution Function (CDF) of the total data rate for the solutions Method 1, Method 2, and the method of the present invention for 12 and 24 resources and six MTs. FIG. 6 depicts the CDF of the total data rate for the same simulations, using 12 MTs. FIGS. 5 and 6 both show that the total data rate for all algorithms is improved as a result of the higher number of resources or bandwidth. Another general observation is that for the same number of resources, the total data rates are increased due to the multi-user diversity, i.e., the higher the number of MTs, the higher is the probability of MTs with good channel qualities.

Figure 7:
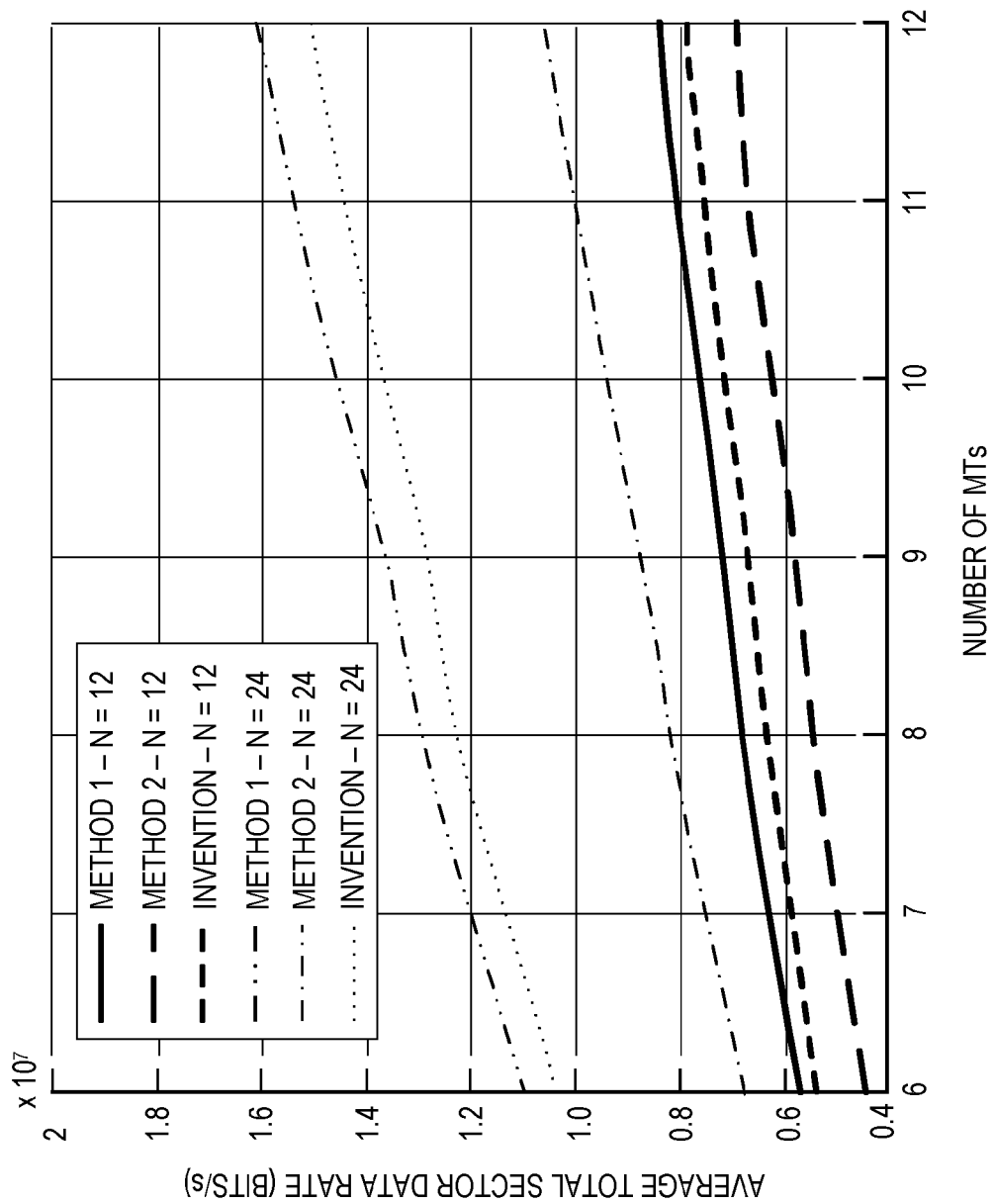

The gains in the total data rate due to the higher bandwidth and the multi-user diversity can be better visualized in average terms in FIG. 7, which depicts the average total data rate versus the number of MTs for the Method 1, Method 2, and the inventive method, for different numbers of resources. Method 1 is an optimal solution; Method 2 and the method of the present invention are suboptimal. As the Figures show, the performance loss of the inventive method relative to the optimal Method 1 is not less than 3.3%, while the comparable relative performance loss of Method 2 are within the ranges [9.2%; 12.7%] and [19.0%; 23.8%] for the scenarios with 12 and 24 resources, respectively. Additionally, the inventive method presents only affordable computational complexity, as opposed to the significantly more burdensome computational complexity of prior art methods. Accordingly, the inventive method is feasible for practical use in the resource allocation task due to its good performance-complexity trade-off compared to the prior art.

Figure 8:
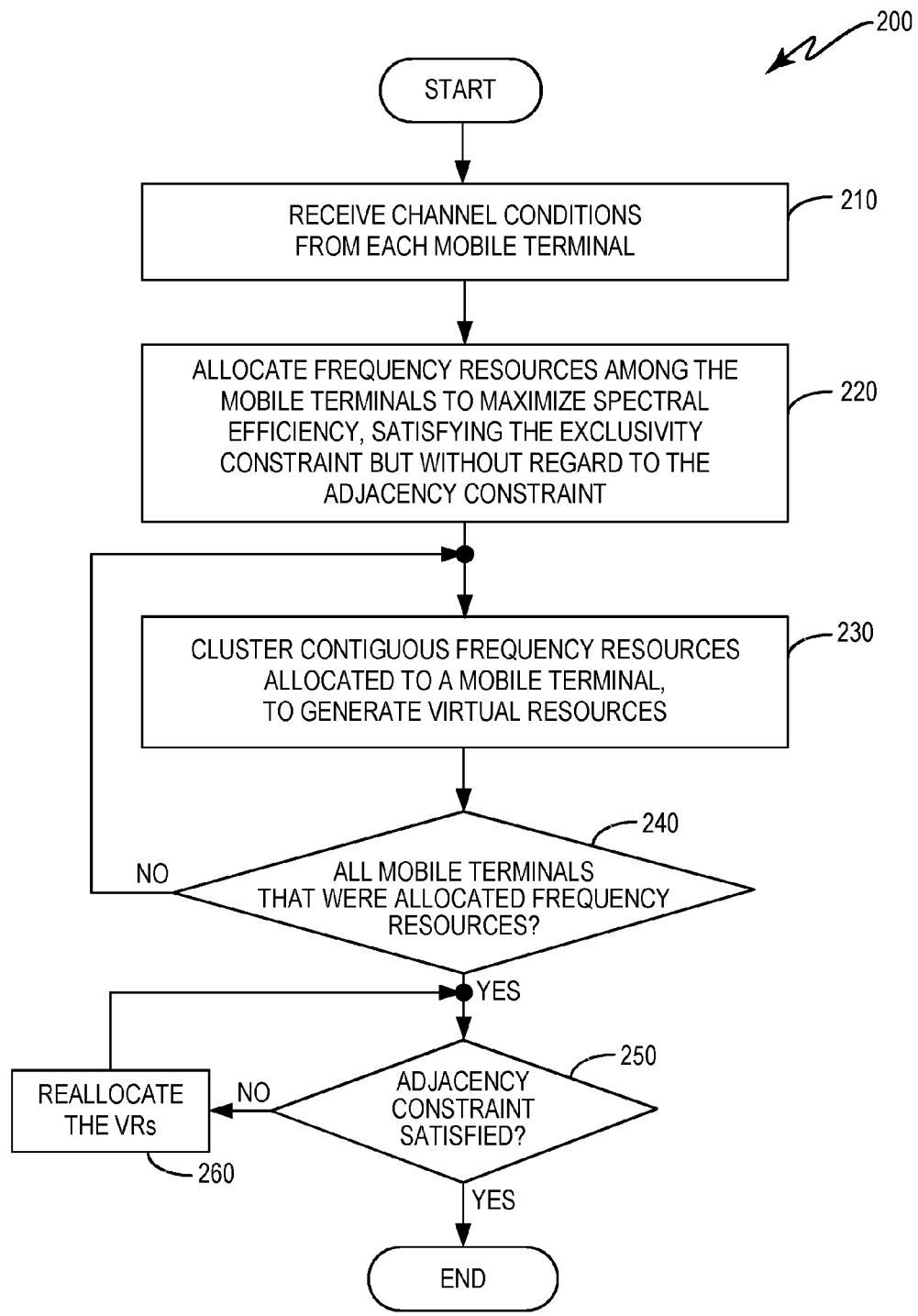
FIG. 8 is an alternate flow diagram of the method of FIG. 2.

FIG. 8 depicts an efficient RRA method 200 for e.g. SC-FDMA uplink, which is an alternate presentation of the RRA method 100 depicted in FIG. 2. To begin, a network node, such as a base station, receives reports of channel conditions for each frequency resource (e.g., each set of one or more sub-carriers) as experienced by each mobile terminal (block 210). The network node initially allocates frequency resources among the mobile terminals, based on the received channel conditions, to maximize spectral efficiency (block 220). The allocation satisfies the exclusivity constraint, but is made without regard to the adjacency constraint. For a given mobile terminal that was allocated at least one frequency resource in block 220, the network node clusters contiguous frequency resources allocated to that mobile terminal, to generate one or more virtual resources (block 230). This step is repeated for each mobile terminal that was allocated at least one frequency resource in block 220 (block 240). If the adjacency constraint is not satisfied (block 250), virtual resources are reallocated among the mobile terminals (block 260)—e.g., by applying one or more of the three reallocation rules described above. The reallocation (block 260) continues iteratively until the SC-FDMA adjacency constraint is satisfied (block 250).

Figure 9:
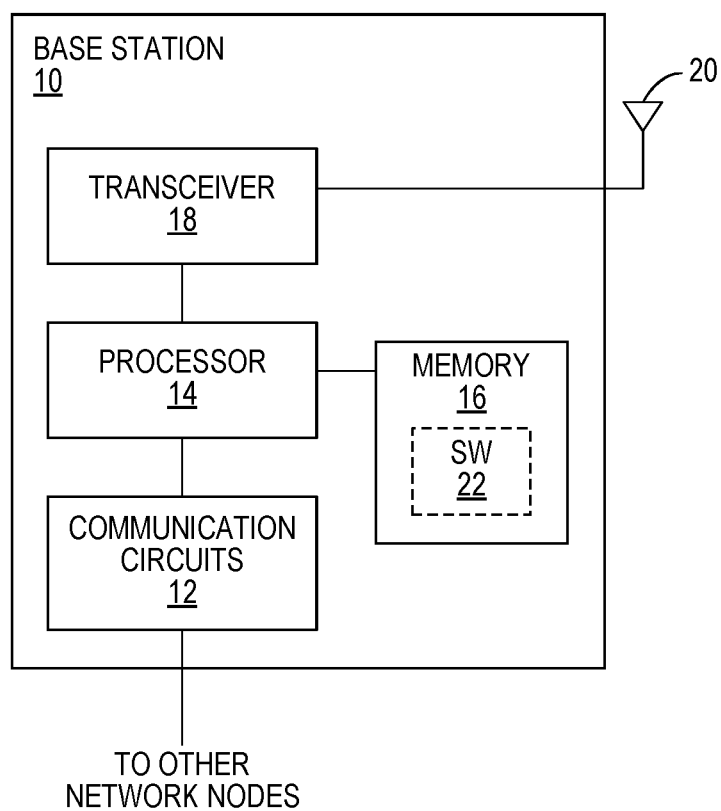
FIG. 9 is a functional block diagram of a representative base station operative to perform the method of FIG. 2.

The RRA method 100, 200 of the present invention may be advantageously implemented in a base station or other node in a wireless communication network. FIG. 9 depicts a representative base station 10. As those of skill in the art are aware, a base station 10 is a network node providing wireless communication services to one or more MTs in a geographic region known as a cell or sector. A base station 10 includes communication circuitry 12 operative to exchange data with other network nodes; a controller or processor 14; memory 16; and radio circuitry, such as a transceiver 18, one or more antennas 20, and the like, to effect wireless communication across an air interface to one or more MTs. According to embodiments of the present invention, the memory 16 is operative to store, and the controller 14 operative to execute, software 22 which when executed is operative to cause the base station 10 to perform the method 100 as described herein.

The controller 14 may comprise any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. The memory 16 may comprise any non-transient machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. The radio circuitry may comprise one or more transceivers 18 used to communicate with MTs via a Radio Access Network according to one or more communication protocols known in the art or that may be developed, such as IEEE 802.xx, CDMA, WCDMA, GSM, LTE, UTRAN, WiMax, or the like. The transceiver 18 implements transmitter and receiver functionality appropriate to the Radio Access Network links (e.g., frequency allocations and the like). The transmitter and receiver functions may share circuit components and/or software, or alternatively may be implemented separately. The communication circuitry 12 may comprise a receiver and transmitter interface used to communicate with one or more other nodes over a communication network according to one or more communication protocols known in the art or that may be developed, such as Ethernet, TCP/IP, SONET, ATM, or the like. The communication circuitry 12 implements receiver and transmitter functionality appropriate to the communication network links (e.g., optical, electrical, and the like). The transmitter and receiver functions may share circuit components and/or software, or alternatively may be implemented separately.

Embodiments of the present invention provide a solution to the resource allocation problem in the SC-FDMA uplink scenario with much lower worst-case computational complexity and reasonable performance losses compared to the first method presented in the '934 patent. Additionally, embodiments of the present invention provide a solution to the resource allocation problem in the SC-FDMA uplink scenario with lower worst-case computational complexity and better performance results than the second method presented in the '934 patent. Accordingly, the inventive method provides a practical solution yielding good performance with only affordable computational complexity.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method by a base station of a wireless communication network of allocating a first plurality of frequency resources among a second plurality of requesting mobile terminals, the allocation satisfying both an exclusivity constraint that each frequency resource is allocated to only one mobile terminal, and an adjacency constraint that all frequency resources allocated to any given mobile terminal are contiguous in a frequency domain, the method comprising:
receiving channel conditions of the frequency resources as experienced by each mobile terminal;
initially allocating frequency resources among the mobile terminals, based on the received channel conditions, to maximize spectral efficiency, the allocation satisfying the exclusivity constraint but made without regard to the adjacency constraint;
for each mobile terminal allocated at least one frequency resource, clustering contiguous frequency resources allocated to the mobile terminal, to generate one or more virtual resources (VR); and
iteratively reallocating the VRs according to one or more predetermined rules until the allocation satisfies the adjacency constraint.

2. The method of claim 1, wherein the received channel conditions comprises a Signal to Interference and Noise Ratio (SINR) metric for each mobile terminal.

3. The method of claim 1:
wherein iteratively reallocating the VRs according to predetermined rules generates a third plurality of VR allocations; and
further comprising selecting one of the VR allocations out of the third plurality of VR allocations based on an efficiency metric so as to maximize total system efficiency.

4. The method of claim 3, wherein the efficiency metric is a total data rate achieved when a given VR is assigned to a corresponding mobile terminal.

5. The method of claim 1, wherein the one or more predetermined rules comprise a first predetermined rule that comprises:
identifying a first VR and a second, non-adjacent VR allocated to the same mobile terminal;
clustering all VRs lying between the first and second VR, inclusively, to form a new VR; and
allocating the new VR to that mobile terminal.

6. The method of claim 5, wherein the one or more predetermined rules comprise a second predetermined rule that comprises:
- identifying a VR allocated to a particular mobile terminal;
- clustering an adjacent VR with the identified VR to form a new VR; and
- allocating the new VR to that mobile terminal.

7. The method of claim 6:
- wherein the second predetermined rule further comprises ascertaining that no VR comprising lower frequency resources is allocated to that mobile terminal; and
- wherein the clustered adjacent VR is the next lower-frequency VR, if any.

8. The method of claim 6:
- wherein the second predetermined rule further comprises ascertaining that no VR comprising higher frequency resources is allocated to that mobile terminal; and
- wherein the clustered adjacent VR is the next higher-frequency VR, if any.

9. A base station, the base station operative in a wireless communication network to allocate a first plurality of frequency resources among a second plurality of requesting mobile terminals, the allocation satisfying both an exclusivity constraint that each frequency resource is allocated to only one mobile terminal, and an adjacency constraint that all frequency resources allocated to any given mobile terminal are contiguous in a frequency domain, the base station comprising:
- a transceiver operative to exchange signaling messages with each requesting mobile terminal and to receive channel conditions of the frequency resources as experienced by each mobile terminal;
- memory operative to store the received channel conditions; and
- one or more processing circuits coupled to the memory and the transceiver and configured to function as a controller operative to:
  - initially allocate frequency resources among the mobile terminals, based on the received channel conditions, to maximize spectral efficiency, the allocation satisfying the exclusivity constraint but made without regard to the adjacency constraint;
  - for each mobile terminal allocated at least one frequency resource, cluster contiguous frequency resources allocated to the mobile terminal, to generate one or more virtual resources (VR); and
  - iteratively reallocate the VRs according to one or more predetermined rules until the allocation satisfies the adjacency constraint.

10. The base station of claim 9, wherein the received channel conditions comprises a Signal to Interference and Noise Ratio (SINR) metric for each mobile terminal.

11. The base station of claim 9:
- wherein iteratively reallocating the VRs according to predetermined rules generates a third plurality of VR allocations;
- wherein the controller is operative to select one of the VR allocations based on an efficiency metric so as to maximize total system efficiency.

12. The base station of claim 11, wherein the efficiency metric is the total data rate achieved when a given VR is assigned to a corresponding mobile terminal.

13. The base station of claim 9, wherein a first predetermined rule comprises:
- identifying a first VR and a second, non-adjacent VR allocated to the same mobile terminal;
- clustering all VRs lying between the first and second VR, inclusively, to form a new VR; and
- allocating the new VR to that mobile terminal.

14. The base station of claim 13, wherein a second predetermined rule comprises:
- identifying a VR allocated to a particular mobile terminal;
- clustering an adjacent VR with the identified VR to form a new VR; and
- allocating the new VR to that mobile terminal.

15. The base station of claim 14:
- wherein the second predetermined rule further comprises ascertaining that no VR comprising lower frequency resources is allocated to that mobile terminal; and
- wherein the clustered adjacent VR is the next lower-frequency VR, if any.

16. The base station of claim 14:
- wherein the second predetermined rule further comprises ascertaining that no VR comprising higher frequency resources is allocated to that mobile terminal; and
- wherein the clustered adjacent VR is the next higher-frequency VR, if any.

17. A computer program product stored in a non-transitory computer readable medium for controlling allocation of a first plurality of frequency resources among a second plurality of requesting mobile terminals, the allocation satisfying both an exclusivity constraint that each frequency resource is allocated to only one mobile terminal, and an adjacency constraint that all frequency resources allocated to any given mobile terminal are contiguous in a frequency domain, the computer program product comprising software instructions which, when run on one or more processors of a base station, causes the base station to:
- initially allocate frequency resources among the mobile terminals, based on stored channel conditions of the frequency resources as experienced by each mobile terminal, to maximize spectral efficiency, the allocation satisfying the exclusivity constraint but made without regard to the adjacency constraint;
- for each mobile terminal allocated at least one frequency resource, cluster contiguous frequency resources allocated to the mobile terminal, to generate one or more virtual resources (VR); and
- iteratively reallocate the VRs according to one or more predetermined rules until the resource allocation satisfies the adjacency constraint.

* * * * *